(12) United States Patent
Yamasaki et al.

(10) Patent No.: US 9,606,516 B2
(45) Date of Patent: Mar. 28, 2017

(54) PLANT CONTROL APPARATUS, PLANT CONTROL METHOD, AND NON-TRANSITORY COMPUTER-READABLE RECORDING MEDIUM

(71) Applicants: Masuo Yamasaki, Tokyo (JP); Akimasa Nakai, Saitama (JP); Akinori Tani, Tokyo (JP)

(72) Inventors: Masuo Yamasaki, Tokyo (JP); Akimasa Nakai, Saitama (JP); Akinori Tani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 858 days.

(21) Appl. No.: 13/627,253

(22) Filed: Sep. 26, 2012

(65) Prior Publication Data
US 2013/0085584 A1    Apr. 4, 2013

(30) Foreign Application Priority Data

Sep. 30, 2011   (JP) .................. 2011-217130

(51) Int. Cl.
*G05B 13/02*    (2006.01)
*G05B 11/42*    (2006.01)

(52) U.S. Cl.
CPC .................. *G05B 11/42* (2013.01)

(58) Field of Classification Search
USPC ...... 307/17, 19, 29; 700/29, 42, 47, 48, 254, 700/260, 280
See application file for complete search history.

(56) References Cited

U.S. PATENT DOCUMENTS 4,679,136 A * 7/1987 Shigemasa ............... 700/30
5,248,921 A * 9/1993 Kato ............... G05B 19/19
                                                    318/560

(Continued)

FOREIGN PATENT DOCUMENTS

JP    09-190201    11/1996

OTHER PUBLICATIONS

Office action issued Nov. 26, 2015 in corresponding German Patent Application No. 102012217628.4, with English translation.

*Primary Examiner* — Robert Fennema
*Assistant Examiner* — Md N Mia
(74) *Attorney, Agent, or Firm* — Harness, Dickey & Pierce, PLC

(57) ABSTRACT

In accordance with an embodiment, a plant control apparatus includes a deviation calculation unit, a velocity-type PID calculation unit, a plurality of integral calculation units, a plurality of overwrite units, and an automatic balance unit. The deviation calculation unit calculates a deviation between a process value from a plant with operation terminals and a set value corresponding to a control object, and generates a deviation signal. The velocity-type PID calculation unit generates a velocity-type operation amount command signal corresponding to the deviation. The integral calculation units generate position command signals as defined operation terminal position command signals. The overwrite units generate additional position command signals to perform overwrite processing and newly define operation terminal position command signals. The automatic balance unit calculates a deviation between the defined operation terminal position command signals, corrects the operation amount command signal and supplies the corrected operation amount command signal.

19 Claims, 8 Drawing Sheets

(56) References Cited

U.S. PATENT DOCUMENTS

2009/0102409 A1* 4/2009 Okita et al. .................. 318/561
2010/0042261 A1* 2/2010 Ishikawa et al. ............ 700/282
2011/0257785 A1* 10/2011 Nihei et al. .................. 700/254

* cited by examiner

PLANT CONTROL APPARATUS, PLANT CONTROL METHOD, AND NON-TRANSITORY COMPUTER-READABLE RECORDING MEDIUM

CROSS REFERENCE TO RELATED APPLICATIONS

This application is based upon and claims the benefit of priority from the prior Japanese Patent Application No. 2011-217130, filed on Sep. 30, 2011, the entire contents of which are incorporated herein by reference.

FIELD

Embodiments described herein relate generally to a plant control apparatus, a plant control method, and a non-transitory computer-readable recording medium.

BACKGROUND

Proportional-integral-derivative (PID) control is a widely used control method in plant control apparatuses that control plants such as a power plant or a chemical plant. There are two kinds of PID controls: position-type PID control and velocity-type PID control.

Of the above-mentioned two control methods, the velocity-type PID control method that locates an integral calculation unit on the lowermost stream side has the advantage of dispensing with tracking processing.

However, the velocity-type PID control has the following problem. For example, when a plurality of operation terminals arranged in parallel in the piping configuration of a plant are simultaneously operated by one velocity-type PID calculation unit, the difference of values initially made between operation amount commands for the respective operation terminals remains as it is, and has an influence on the subsequent control of the plant. This will be explained with reference to FIG. 7 and FIG. 8.

FIG. 7 is a diagram showing an example of a conventional plant control apparatus. The plant control apparatus shown in FIG. 7 is configured so that two operation terminals 2A and 2B arranged in parallel in the piping configuration of a plant PT are simultaneously operated by one velocity-type PID calculation unit 5. As primary components, the plant control apparatus includes a first deviation calculation unit 4, the velocity-type PID calculation unit 5, an A-integral calculation unit 6A, a B-integral calculation unit 6B, an MV-A overwrite unit 7A, and an MV-B overwrite unit 7B. In the example shown in FIG. 7, both the operation terminals 2A and 2B to be operated are control valves having an operating range of 0% to 100%.

The first deviation calculation unit 4 calculates a deviation between a set value SV which is a desired value of control and a process value PV which is a control target, and outputs a deviation (e). The process value PV is sent from a sensor 3 of the plant PT. The velocity-type PID calculation unit 5 performs a velocity-type PID calculation on receipt of the deviation (e) from the first deviation calculation unit 4, and outputs a velocity-type operation amount command signal SΔMV corresponding to the deviation (e). Both the A-integral calculation unit 6A and the B-integral calculation unit 6B are supplied with the operation amount command signal SΔMV, and output an A-operation terminal position command signal S(MV-A) and a B-operation terminal position command signal S(MV-B) represented by 0% to 100% in accordance with an integral calculation. In this way, the integral calculation is processed by the operation amount command signal SΔMV from the velocity-type PID calculation unit 5, and the A-operation terminal position command signal S(MV-A) or the B-operation terminal position command signal S(MV-B) is thereby generated. This condition is referred to as an automatic mode.

When, for example, an operator has performed manual setting, the MV-A overwrite unit 7A and the MV-B overwrite unit 7B send the manually set values to the A-integral calculation unit 6A and the B-integral calculation unit 6B, respectively. These calculation units perform overwrite processing to transform the A-operation terminal position command signal S(MV-A) and the B-operation terminal position command signal S(MV-B) into signals of the manually set values. In this way, the A-operation terminal position command signal S(MV-A) or the B-operation terminal position command signal S(MV-B) are determined by the operator's manual setting. This condition is referred to as an overwrite mode.

In such a conventional plant control apparatus that uses the velocity-type PID calculation unit, for example, the operator performs manual setting from the MV-A overwrite unit 7A. In this case, the A-integral calculation unit 6A enters the overwrite mode to perform overwrite processing using the manually set value. On the other hand, the B-integral calculation unit 6B continues the automatic mode to perform the integral calculation of ΔMV from the velocity-type PID calculation unit 5. Consequently, the signal S(MV-A) and the signal S(MV-B) become to represent position command values that are different to each other.

If the manual setting by the MV-A overwrite unit 7A is cancelled from this condition, the A-integral calculation unit 6A is switched from the previous overwrite processing with the use of the manually set value to the integral calculation processing of the operation amount command signal SΔMV fed from the velocity-type PID calculation unit 5. However, in this case, there is a difference of the initial values of the integral processing between the A-integral calculation unit 6A and the B-integral calculation unit 6B. Therefore, as shown in the example of FIG. 8, the difference of the initial values remains as it is between the A-operation terminal position command signal S(MV-A) and the B-operation terminal position command signal S(MV-B) which are subsequent calculation results. Accordingly, if the operation amount command signal SΔMV keeps the same positive value in the example of FIG. 8, the operation terminal 2B to which the B-operation terminal position command signal S(MV-B) is input is fully opened earlier than the operation terminal 2A to which the A-operation terminal position command signal S(MV-A) is input. Thereafter, the A-operation terminal position command signal S(MV-A) alone is sent. However, this situation is substantially the same as a situation in which, at the time when the operation terminal 2B has reached its full opening, switching is made from the existing control by two valves to the control by one valve. This leads to the problem of the influence on the control of the plant. It is to be noted that the reason why FIG. 8 shows a condition in which the operation amount command signal SΔMV keeps a positive constant value is to make the above explanation clearer.

DETAILED DESCRIPTION

In accordance with an embodiment, a plant control apparatus includes a deviation calculation unit, a velocity-type PID calculation unit, a plurality of integral calculation units, a plurality of overwrite units, and an automatic balance unit. The deviation calculation unit is configured to calculate a deviation between a process value supplied from a plant to be controlled and a set value corresponding to a control object, and to generate a deviation signal. The plant includes a plurality of operation terminals. The velocity-type PID calculation unit is configured to perform a PID calculation on receipt of the deviation signal from the deviation calculation unit, and to generate a velocity-type operation amount command signal corresponding to the deviation. The plurality of integral calculation units are provided in association with the number of the operation terminals and configured to generate position command signals for the respective operation terminals as defined operation terminal position command signals in accordance with the operation amount command signal. The plurality of overwrite units are provided to respectively correspond to the integral calculation units and are configured to generate additional position command signals for the respective operation terminals, to perform overwrite processing for the corresponding integral calculation units and to newly define operation terminal position command signals. The automatic balance unit is configured to be supplied with the defined operation terminal position command signals, to calculate a deviation between the defined operation terminal position command signals, to correct the operation amount command signal in accordance with the result of the calculation, and to supply the corrected operation amount command signal to the corresponding integral calculation units.

Embodiments will now be explained with reference to the accompanying drawings. Like components are provided with like reference signs throughout the drawings and repeated descriptions thereof are appropriately omitted.

(A) Plant Control Apparatus (1) Apparatus Configuration

Figure 1:
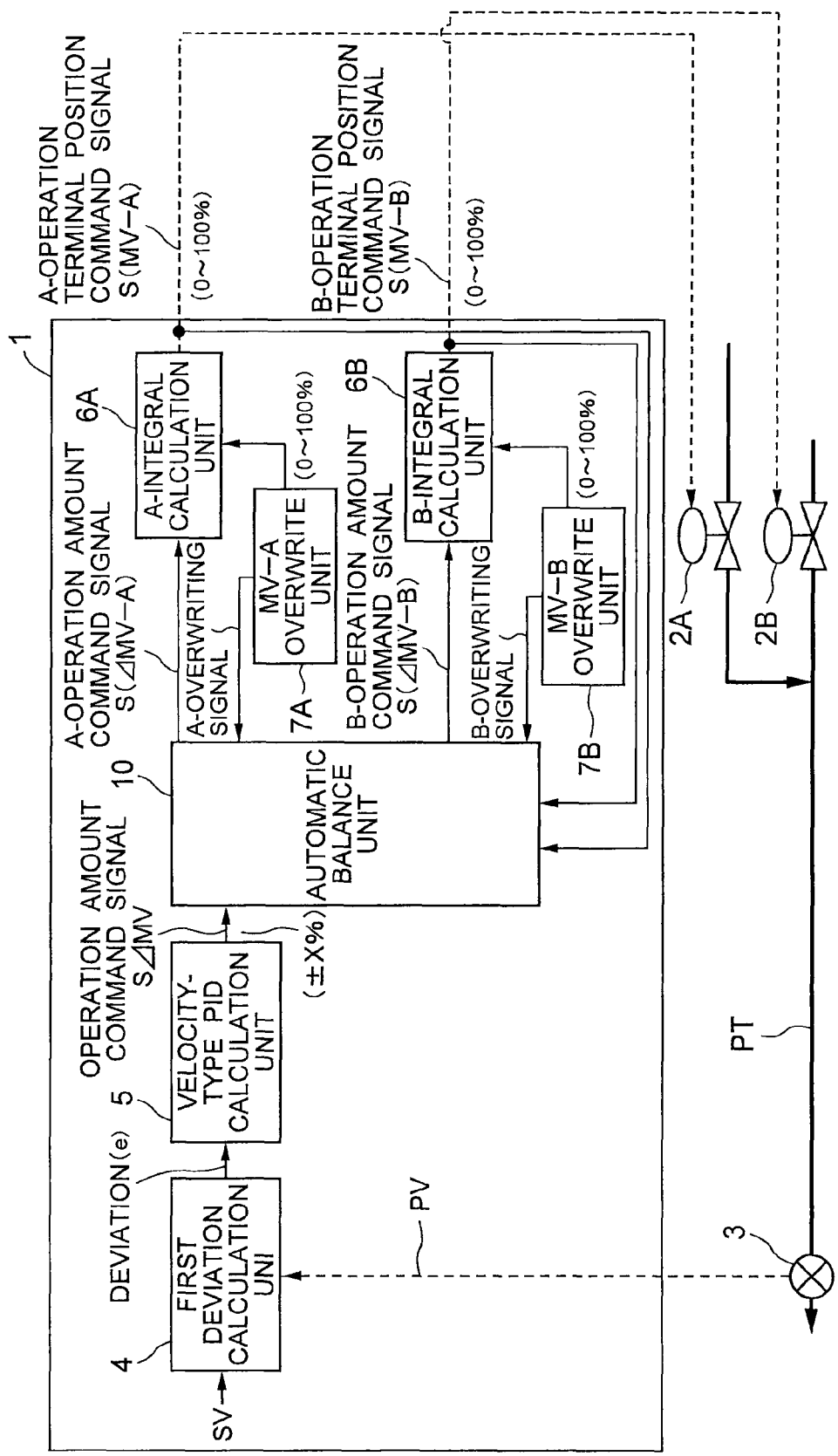
FIG. 1 is a schematic configuration diagram of a plant control apparatus according to one embodiment.

FIG. 1 is a diagram showing a schematic configuration of a plant control apparatus according to one embodiment. A plant control apparatus 1 shown in FIG. 1 includes a first deviation calculation unit 4, a velocity-type PID calculation unit 5, an automatic balance unit 10, an A-integral calculation unit 6A, a B-integral calculation unit 6B, an MV-A overwrite unit 7A, and an MV-B overwrite unit 7B. In the piping of a plant PT, operation terminals 2A and 2B are arranged in parallel. Although the number of the operation terminals in the plant PT is two for easier explanation in the present embodiment, it should be understood that three or more operation terminals may be arranged. In this case, the numbers of integral calculation units and overwrite units provided in the plant control apparatus 1 correspond to the number of the operation terminals in the plant PT.

The first deviation calculation unit 4 calculates a deviation between a process value PV which is a control target and a set value SV which is a desired value of control sent from a sensor 3 of the plant PT, and outputs a deviation (e). The velocity-type PID calculation unit 5 is connected to the first deviation calculation unit 4. The velocity-type PID calculation unit 5 performs a velocity-type PID calculation on receipt of the deviation (e) from the first deviation calculation unit 4, and outputs a velocity-type operation amount command signal SΔMV corresponding to the deviation (e).

The automatic balance unit 10 is connected to the velocity-type PID calculation unit 5, the A-integral calculation unit 6A, the B-integral calculation unit 6B, the MV-A overwrite unit 7A, and the MV-B overwrite unit 7B. The automatic balance unit 10 is supplied with the operation amount command signal SΔMV from the velocity-type PID calculation unit 5. The automatic balance unit 10 is supplied with an A-overwriting signal and a B-overwriting signal from the MV-A overwrite unit 7A and the MV-B overwrite unit 7B. The A-overwriting signal and the B-overwriting signal respectively indicate whether overwrite processing is being performed in the A-integral calculation unit 6A and the B-integral calculation unit 6B. Moreover, the automatic balance unit 10 is supplied with an A-operation terminal position command signal S(MV-A) and a B-operation terminal position command signal S(MV-B) from the A-integral calculation unit 6A and the B-integral calculation unit 6B, respectively.

The automatic balance unit 10 judges whether there is a deviation between the A-operation terminal position command signal S(MV-A) and the B-operation terminal position command signal S(MV-B).

In some case the A-operation terminal position command signal S(MV-A) and the B-operation terminal position command signal S(MV-B) have no deviation and are equal, or the deviation is equal to or less than a preset value. In this case, the automatic balance unit 10 sends, as it is, the operation amount command signal SΔMV supplied from the velocity-type PID calculation unit 5, to the A-integral calculation unit 6A and the B-integral calculation unit 6B as an A-operation amount command signal S(ΔMV-A) and a B-operation amount command signal S(ΔMV-B), respectively.

In another case, the A-operation terminal position command signal S(MV-A) and the B-operation terminal position command signal S(MV-B) are not equal and have a deviation, or the deviation is greater than the preset value and both the A-overwriting signal and the B-overwriting signal are off. In this case, the automatic balance unit 10 adds or subtracts a predetermined fixed value or a variable value corresponding to the deviation to or from the original A-operation amount command signal S(ΔMV-A) and the original B-operation amount command signal S(ΔMV-B) in a direction to decrease the deviation between the A-operation terminal position command signal S(MV-A) and the B-operation terminal position command signal S(MV-B). The automatic balance unit 10 then outputs the A-operation amount command signal S(ΔMV-A) and the B-operation amount command signal S(ΔMV-B) that are newly defined.

When the A-operation terminal position command signal S(MV-A) and the B-operation terminal position command signal S(MV-B) have become equal or when the deviation therebetween has become equal to or less than the preset value, the automatic balance unit 10 stops the processing to add or subtract the predetermined fixed value or the variable value corresponding to the deviation to or from the original S(ΔMV-A) and the original S(ΔMV-B). The automatic balance unit 10 then defines, as it is, the operation amount command signal SΔMV supplied from the velocity-type PID calculation unit 5 as the A-operation amount command signal S(ΔMV-A) and the B-operation amount command signal S(ΔMV-B) and outputs these signals. Even when the A-operation terminal position command signal S(MV-A) and the B-operation terminal position command signal S(MV-B) are not equal and have a deviation or even when the deviation is greater than the preset value, the automatic balance unit 10 defines, as it is, the operation amount command signal SΔMV supplied from the velocity-type PID calculation unit 5 as the A-operation amount command signal S(ΔMV-A) and the B-operation amount command signal S(ΔMV-B) and outputs these signals if one or both of the A-overwriting signal and the B-overwriting signal are on.

The A-operation amount command signal S(ΔMV-A) and the B-operation amount command signal S(ΔMV-B) that are defined as described above are respectively supplied to the A-integral calculation unit 6A and the B-integral calculation unit 6B from the automatic balance unit 10. The A-integral calculation unit 6A and the B-integral calculation unit 6B perform the integral calculation of the respective operation amounts, and output the calculation results as a 2A-operation terminal position command signal S(MV-A) and a 2B-operation terminal position command signal S(MV-B), respectively.

If an interrupt request is made, for example, by operator's manual operation, the MV-A overwrite unit 7A and the MV-B overwrite unit 7B write the corresponding value over integrator elements of the A-integral calculation unit 6A and the B-integral calculation unit 6B. During the overwrite processing, the MV-A overwrite unit 7A and the MV-B overwrite unit 7B switch on and output the A-overwriting signal and the B-overwriting signal, respectively.

(2) Function

The function of the plant control apparatus 1 in FIG. 1 is described with reference to FIG. 2 as one embodiment of a plant control method.

First, in the automatic mode in which both the MV-A overwrite unit 7A and the MV-B overwrite unit 7B are not performing overwrite processing, the automatic balance unit 10 is supplied with the operation amount command signal SΔMV from the velocity-type PID calculation unit 5. The automatic balance unit 10 then defines, as it is, the operation amount command signal SΔMV as the A-operation amount command signal S(ΔMV-A) and the B-operation amount command signal S(ΔMV-B), and sends these signals to the A-integral calculation unit 6A and the B-integral calculation unit 6B, respectively. The A-integral calculation unit 6A and the B-integral calculation unit 6B are respectively supplied with the A-operation amount command signal S(ΔMV-A) and the B-operation amount command signal S(ΔMV-B) that are defined, and then perform integral calculation processing. For clarity, the example in FIG. 2 shows a condition in which the operation amount command signal SΔMV keeps a positive constant value. However, when both the A-operation terminal position command signal S(MV-A) and the B-operation terminal position command signal S(MV-B) are in the automatic mode, the A-operation terminal position command signal S(MV-A) and the B-operation terminal position command signal S(MV-B) respectively that are output from the A-integral calculation unit 6A and the B-integral calculation unit 6B have the same value, and increase at a constant rate. This is shown in FIG. 2 in a thick solid line in the left side of the graph.

From this condition the operator performs manual setting, for example, for the operation terminal 2A, and overwrite processing is performed by the MV-A overwrite unit 7A. Accordingly, the A-operation terminal position command signal S(MV-A) which is the output of the A-integral calculation unit 6A is overwritten to the value supplied from MV-A overwrite unit 7A, and defined as a new A-operation terminal position command signal S(MV-A).

Figure 2:
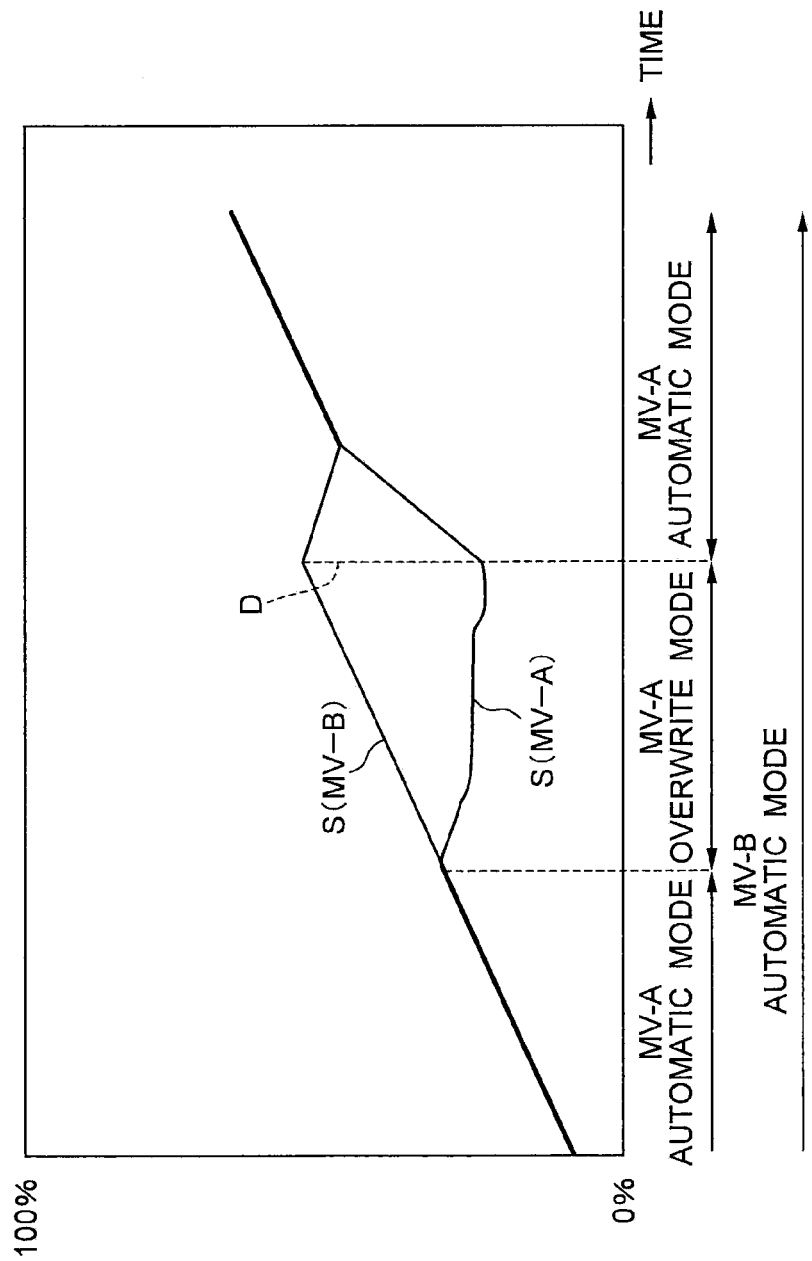
FIG. 2 is a graph illustrating the operation of the plant control apparatus shown in FIG. 1.

In FIG. 2, the signal S(MV-A) is shown in a falling curve (thin line).

On the other hand, the B-operation terminal position command signal S(MV-B) that continues the automatic mode keeps increasing at an unchanged rate. This leads to a deviation D between the A-operation terminal position command signal S(MV-A) and the B-operation terminal position command signal S(MV-B) as shown in FIG. 2. At the same time, the automatic balance unit 10 is supplied with the A-operation terminal position command signal S(MV-A) and the B-operation terminal position command signal S(MV-B), and then judges whether there is a deviation therebetween. As a result, the automatic balance unit 10 detects that there is a deviation between the A-operation terminal position command signal S(MV-A) and the B-operation terminal position command signal S(MV-B) and that the relation therebetween is the A-operation terminal position command signal S(MV-A)<the B-operation terminal position command signal S(MV-B).

From this condition, when the manual setting for the operation terminal 2A is cancelled, and the overwrite processing performed by the MV-A overwrite unit 7A is cancelled, then the MV-A automatic mode returns. The automatic balance unit 10 has already detected that there is a deviation between the A-operation terminal position command signal S(MV-A) and the B-operation terminal position command signal S(MV-B), and both the A-overwriting signal and the B-overwriting signal are off. Therefore, the automatic balance unit 10 adds or subtracts a predetermined fixed value or a variable value corresponding to the deviation to or from the A-operation amount command signal S(ΔMV-A) and the B-operation amount command signal S(ΔMV-B) in a direction to decrease and correct the deviation between the A-operation terminal position command signal S(MV-A) and the B-operation terminal position command signal S(MV-B). The automatic balance unit 10 then outputs the calculation results. In the example of FIG. 2, there is a magnitude correlation such that: the A-operation terminal position command signal S(MV-A)<the B-operation terminal position command signal S(MV-B). Therefore, in order to decrease the deviation D between the A-operation terminal position command signal S(MV-A) and the B-operation terminal position command signal S(MV-B), correction processing is performed. In the correction processing, a predetermined fixed value or a variable value positive number corresponding to the deviation D is added to the A-operation amount command signal S(ΔMV-A) toward an increase, and a predetermined fixed value or a variable value negative number corresponding to the deviation is added to the B-operation amount command signal S(ΔMV-B) toward a decrease.

Consequently, as shown in FIG. 2, the A-operation terminal position command signal S(MV-A) increases, and the B-operation terminal position command signal S(MV-B) decreases. Thus, the deviation D between the A-operation terminal position command signal S(MV-A) and the B-operation terminal position command signal S(MV-B) is decreased. At the point where these signals are equal or the deviation therebetween is equal to or less than the preset value in the end, the addition and subtraction processing for the A-operation amount command signal S(ΔMV-A) and the B-operation amount command signal S(ΔMV-B) is stopped.

In the example of FIG. 2, the increase rate of the A-operation terminal position command signal S(MV-A) is higher than the decrease rate of the B-operation terminal position command signal S(MV-B) during the correction processing for the A-operation terminal position command signal S(MV-A) and the B-operation terminal position command signal S(MV-B). This is because the operation amount command signal SΔMV from the velocity-type PID calculation unit 5 increases at a constant rate.

Thus, according to the plant control apparatus 1 in the present embodiment, a plurality of operation terminals arranged in parallel in the piping configuration of a plant are simultaneously operated by one velocity-type PID calculation unit, and an overwrite unit for a manual setting is located downstream of the velocity-type PID calculation unit for each of the operation terminals. In this case, even when a difference is made between position command values for the respective operation terminals as a result of overwrite processing, automatic control from the velocity-type PID calculation unit is continued, and the deviation between the position command values for the respective operation terminals can be automatically eliminated after the cancellation of the overwrite processing.

(3) Specific Configuration of Automatic Balance Unit

The configuration of the automatic balance unit 10 provided in the plant control apparatus 1 shown in FIG. 1 is described in more detail with several examples.

(i) Deviation Correction using Fixed Value

Figure 3:
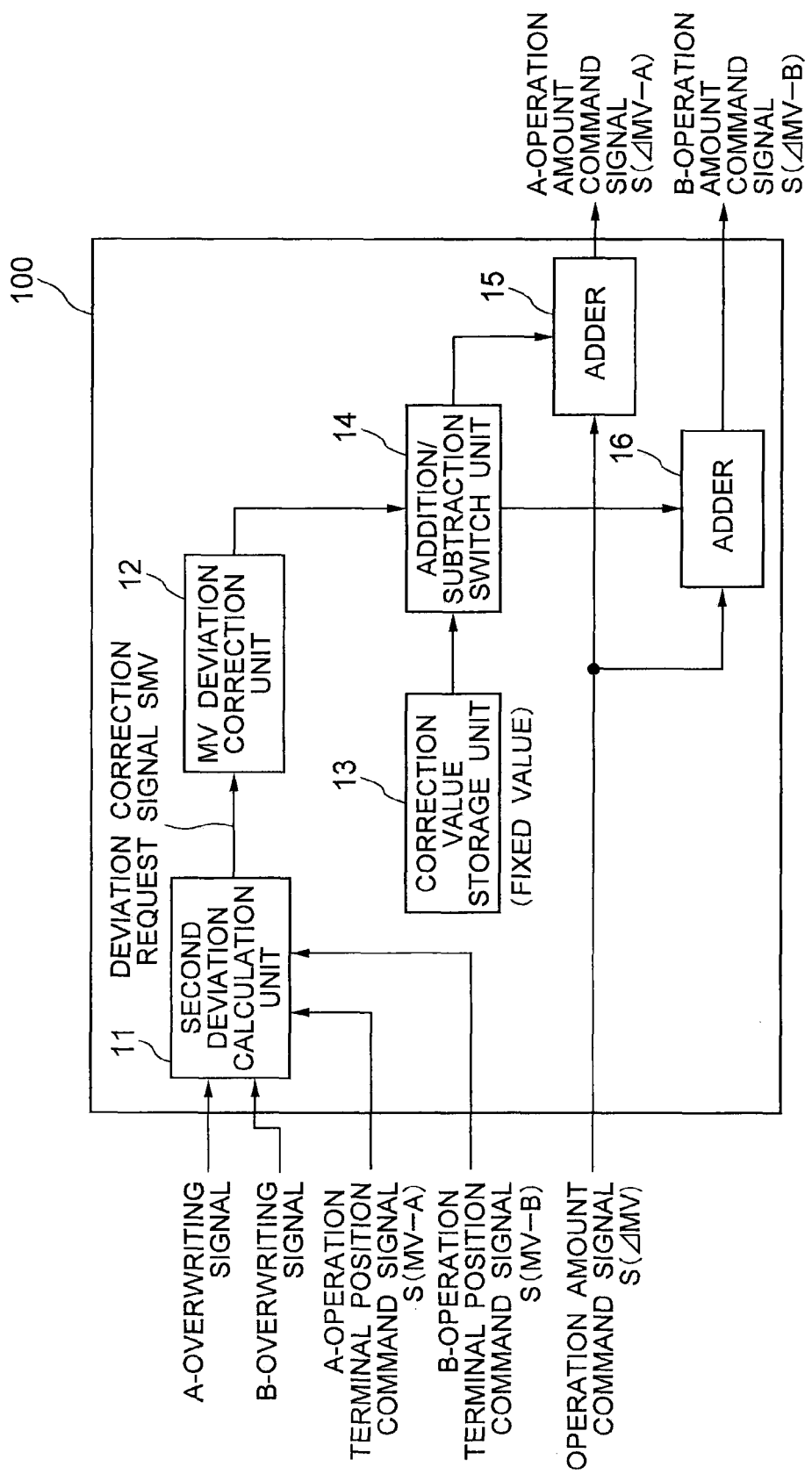
FIG. 3 is a diagram showing a first example of the specific internal configuration of an automatic balance unit in the plant control apparatus shown in FIG. 1.

An automatic balance unit 100 shown in FIG. 3 is configured to use a predetermined fixed value to correct the deviation between the A-operation terminal position command signal S(MV-A) and the B-operation terminal position command signal S(MV-B).

More specifically, the automatic balance unit 100 shown in FIG. 3 includes a second deviation calculation unit 11, an MV deviation correction unit 12, a correction value storage unit 13, an addition/subtraction switch unit 14, and adders 15 and 16.

The second deviation calculation unit 11 is connected to the MV-A overwrite unit 7A and the MV-B overwrite unit 7B (see FIG. 1), and is supplied with the A-overwriting signal and the B-overwriting signal from these overwrite units. The second deviation calculation unit 11 is also supplied with the A-operation terminal position command signal S(MV-A) and the B-operation terminal position command signal S(MV-B) from the A-integral calculation unit 6A and the B-integral calculation unit 6B, respectively.

The second deviation calculation unit 11 is not activated when both the A-overwriting signal and the B-overwriting signal are off. Therefore, the automatic balance unit 100 defines, as it is, the operation amount command signal SΔMV supplied from the velocity-type PID calculation unit 5 as the A-operation amount command signal S(ΔMV-A) and the B-operation amount command signal S(ΔMV-B) and sends these signals to the A-integral calculation unit 6A and the B-integral calculation unit 6B, respectively.

When at least one of the A-overwriting signal and the B-overwriting signal is switched on, the second deviation calculation unit 11 is activated, and performs a calculation to compare the A-operation terminal position command signal S(MV-A) with the B-operation terminal position command signal S(MV-B). If the A-operation terminal position command signal S(MV-A) and the B-operation terminal position command signal S(MV-B) are not equal as a result of the comparison, the second deviation calculation unit 11 generates a deviation correction request signal SMV and supplies this signal to the MV deviation correction unit 12 when both the A-overwriting signal and the B-overwriting signal are switched off. The MV deviation correction unit 12 supplied with the deviation correction request signal SMV activates the addition/subtraction switch unit 14. The activated addition/subtraction switch unit 14 draws data for the predetermined fixed value from the correction value storage unit 13, performs addition and subtraction processing, and supplies the results of the processing to the adders 15 and 16. More specifically, the data is output to the adder 15 as it is in the case of addition, whereas the data is output to the adder 16 after the reversal of the sign of the data in the case of subtraction.

The adder 15 then adds the amount of data for the fixed value to the operation amount command signal SΔMV supplied from the velocity-type PID calculation unit 5, and sends the result to the A-integral calculation unit 6A as the A-operation amount command signal S(ΔMV-A). Similarly, the adder 16 subtracts the amount of data for the fixed value from the operation amount command signal SΔMV supplied from the velocity-type PID calculation unit 5, and sends the result to the B-integral calculation unit 6B as the B-operation amount command signal S(ΔMV-B).

When the A-operation terminal position command signal S(MV-A) and the B-operation terminal position command signal S(MV-B) are judged to be equal as a result of the comparison calculation at the point where both the A-overwriting signal and the B-overwriting signal are switched off, the second deviation calculation unit 11 does not generate the deviation correction request signal SMV. Thus, as in the case where the second deviation calculation unit 11 is not activated, the automatic balance unit 100 defines, as it is, the operation amount command signal SΔMV supplied from the velocity-type PID calculation unit 5 as the A-operation amount command signal S(ΔMV-A) and the B-operation amount command signal S(ΔMV-B) and sends these signals to the A-integral calculation unit 6A and the B-integral calculation unit 6B, respectively.

Figure 4:
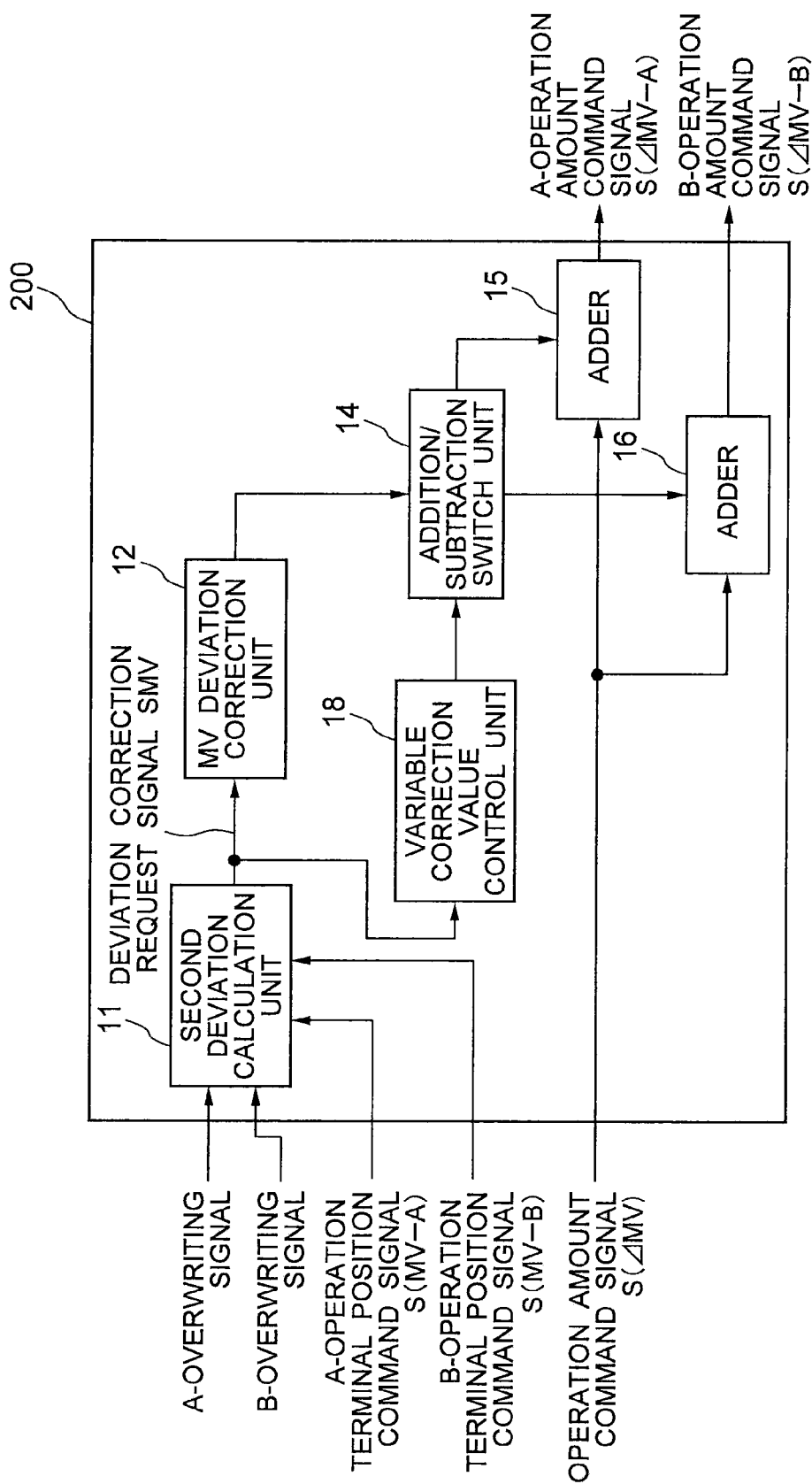
FIG. 4 is a diagram showing a second example of the specific internal configuration of the automatic balance unit in the plant control apparatus shown in FIG. 1.

(ii) Deviation Correction Using Variable Value Corresponding to Deviation Amount An automatic balance unit 200 shown in FIG. 4 is configured to use a variable value corresponding to the deviation between the A-operation terminal position command signal S(MV-A) and the B-operation terminal position command signal S(MV-B) instead of using the fixed value to correct the deviation between the A-operation terminal position command signal S(MV-A) and the B-operation terminal position command signal S(MV-B).

As apparent from the comparison with the automatic balance unit 100 shown in FIG. 3, the automatic balance unit 200 shown in FIG. 4 includes a variable correction value control unit 18 instead of the correction value storage unit 13 shown in FIG. 3. The variable correction value control unit 18 is connected to the second deviation calculation unit 11 and the addition/subtraction switch unit 14.

In the comparison calculation of the A-operation terminal position command signal S(MV-A) and the B-operation terminal position command signal S(MV-B), the second deviation calculation unit 11 also calculates data for the deviation between these signals.

When the second deviation calculation unit 11 generates the deviation correction request signal SMV, the variable correction value control unit 18 is supplied with the deviation data between the A-operation terminal position command signal S(MV-A) and the B-operation terminal position command signal S(MV-B) together with the deviation correction request signal SMV. The variable correction value control unit 18 calculates a correction value in accordance with the degree of the deviation.

The variable correction value control unit 18 supplies the calculated correction value to the addition/subtraction switch unit 14. The addition/subtraction switch unit 14 is activated in accordance with a command from the MV deviation correction unit 12, performs addition and subtraction processing, and supplies the result of the processing to the adders 15 and 16. More specifically, the calculated correction value data is output to the adder 15 as it is in the case of addition, whereas the calculated correction value data is output to the adder 16 after the reversal of the sign of the data in the case of subtraction. Thus, the A-operation amount command signal S(ΔMV-A) and the B-operation amount command signal S(ΔMV-B) corresponding to the deviation amount are sent to the A-integral calculation unit 6A and the B-integral calculation unit 6B, respectively. As a result, the A-operation terminal position command signal S(MV-A) and the B-operation terminal position command signal S(MV-B) are corrected by the amount corresponding to the deviation amount, and then sent to the operation terminals 2A and 2B.

The configuration and function of the automatic balance unit 200 are substantially the same as those of the automatic balance unit 100 described above in other respects.

(iii) Deviation Calculation by Comparison with Dead Band

In the automatic balance units 100 and 200 described above, the second deviation calculation unit 11 generates the deviation correction request signal SMV when the A-operation terminal position command signal S(MV-A) and the B-operation terminal position command signal S(MV-B) are not equal as a result of the comparison calculation of the A-operation terminal position command signal S(MV-A) and the B-operation terminal position command signal S(MV-B). However, this is not a restriction. A dead band may be provided, and a deviation correction request may be made by the comparison with the dead band.

Figure 5:
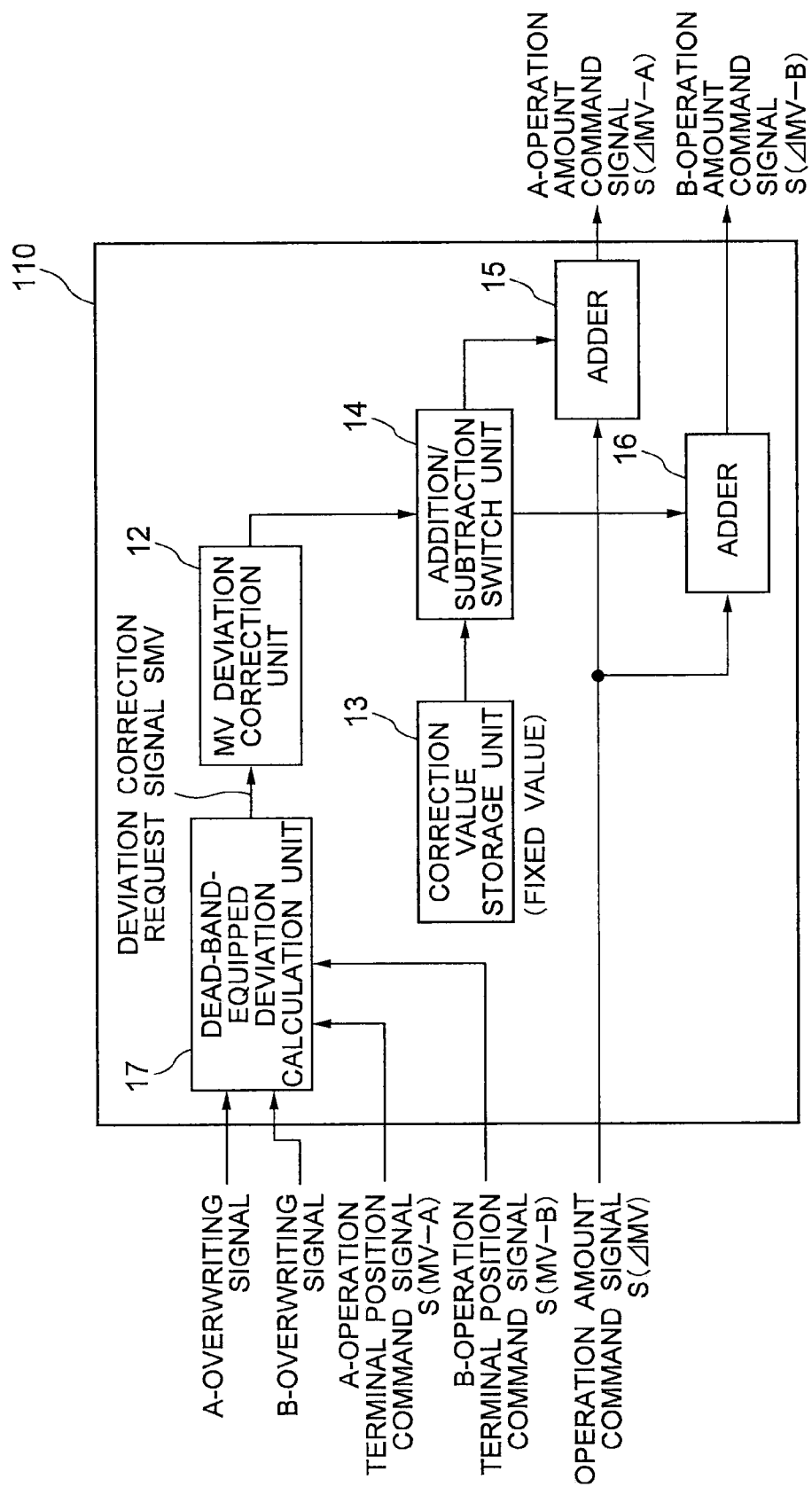
FIG. 5 is a diagram showing a third example of the specific internal configuration of the automatic balance unit in the plant control apparatus shown in FIG. 1.

An automatic balance unit 110 shown in FIG. 5 includes a dead-band-equipped deviation calculation unit 17 instead of the second deviation calculation unit 11 shown in FIG. 3. Even if the A-operation terminal position command signal S(MV-A) and the B-operation terminal position command signal S(MV-B) are not equal, the automatic balance unit 110 generates the deviation correction request signal SMV when the deviation is beyond the dead band. Therefore, the addition to the A-operation amount command signal S(ΔMV-A) and the B-operation amount command signal S(ΔMV-B) based on the correction request is not performed until an MV deviation becomes 0, but is stopped when the MV deviation falls within the range of the dead band.

Figure 6:
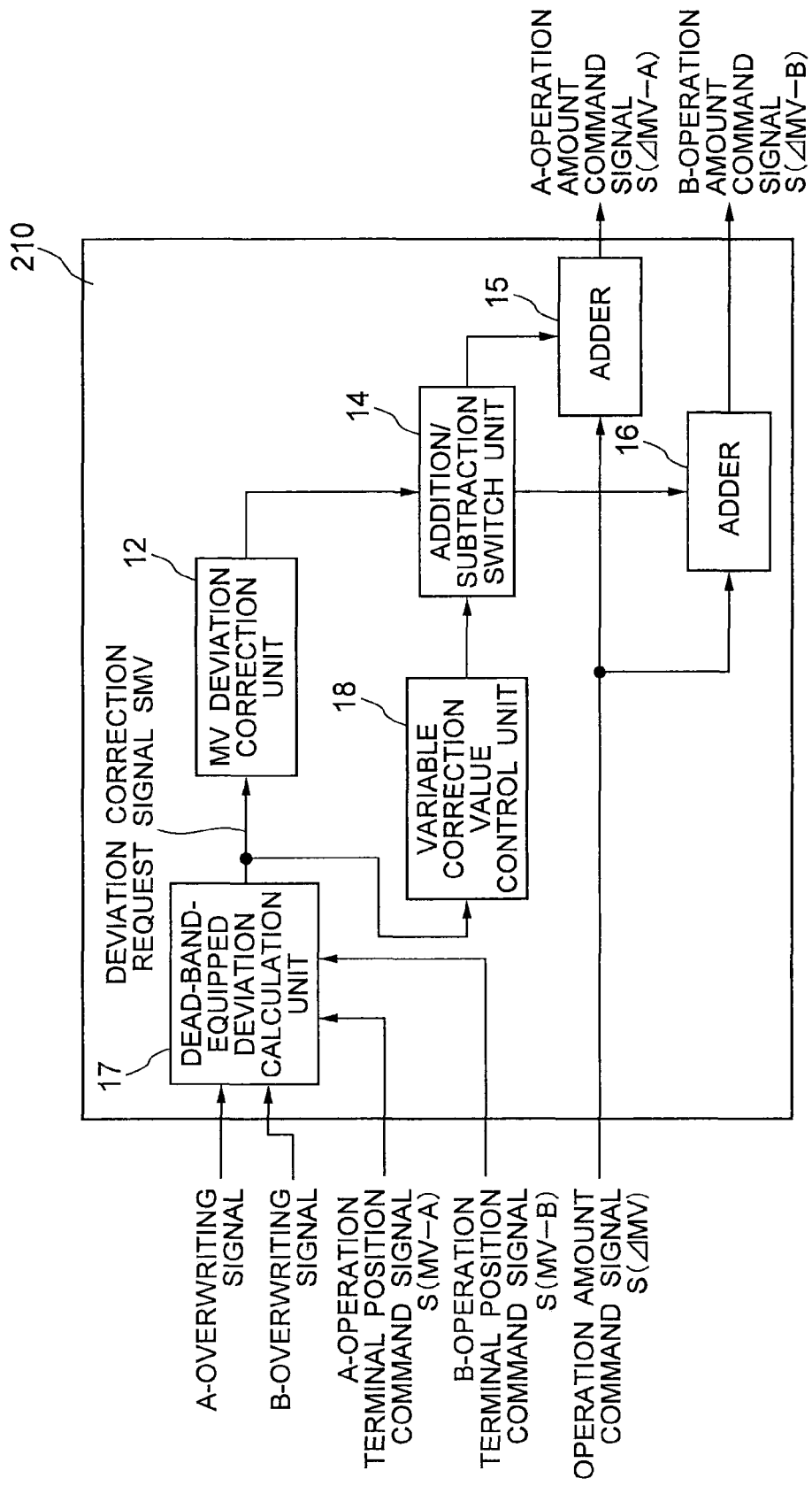
FIG. 6 is a diagram showing a fourth example of the specific internal configuration of the automatic balance unit in the plant control apparatus shown in FIG. 1.
Figure 7:
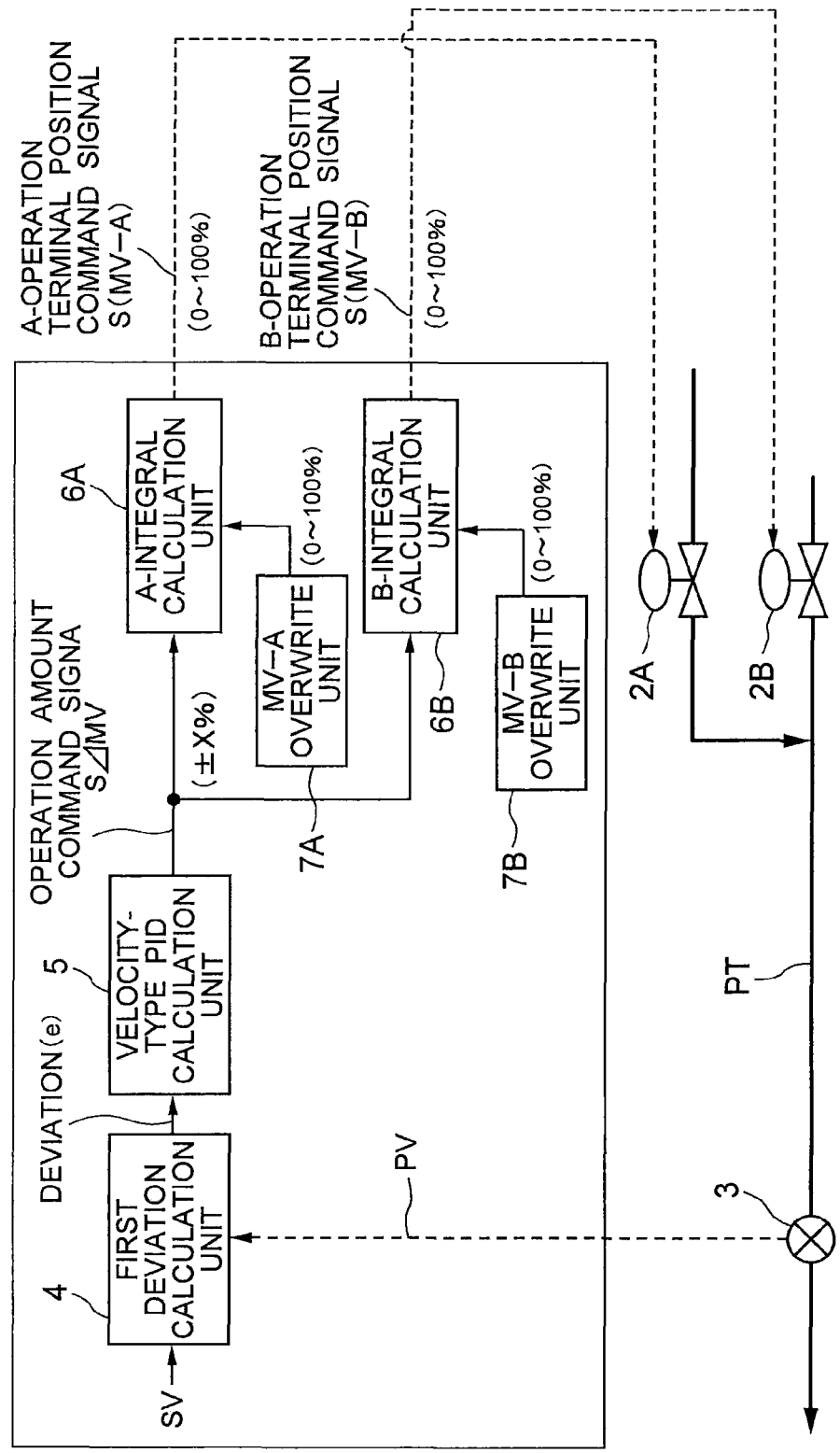
FIG. 7 is a diagram showing the general configuration of an example of a conventional plant control apparatus.
Figure 8:
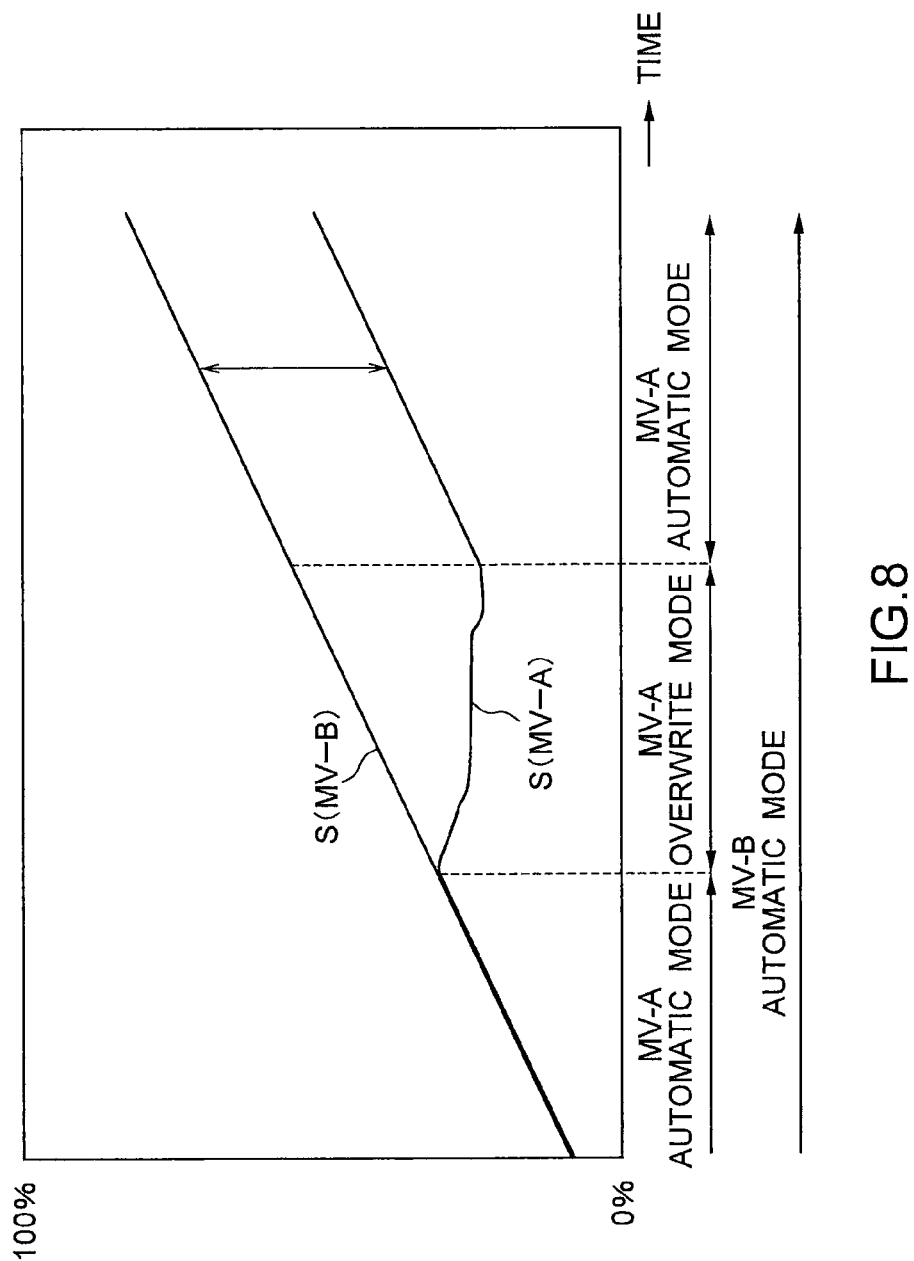
FIG. 8 is a graph illustrating the operation of the plant control apparatus shown in FIG. 7.

Similarly to the automatic balance unit 110, an automatic balance unit 210 shown in FIG. 6 also includes the dead-band-equipped deviation calculation unit 17 instead of the second deviation calculation unit 11 shown in FIG. 4. The automatic balance unit 210 is configured to perform a deviation correction depending on whether the deviation falls within the range of the dead band. The configuration and function of the automatic balance unit 210 shown in FIG. 6 are substantially the same as those of the automatic balance unit 200 shown in FIG. 4 in other respects.

(B) Program and Non-Transitory Computer-Readable Recording Medium

Each component in the plant control apparatus 1 described above can be formed, for example, by an electronic circuit as a dedicated device. However, each operating procedure may be incorporated in a program, and read into and executed by a control computer. This enables the plant control according to the embodiment described above to be carried out by use of the general-purpose control computer. A series of procedures of the plant control described above may be stored in a recording medium such as a flexible disk or a CD-ROM as a program to be executed by a computer, and read into and executed by the control computer.

The recording medium is not limited to a portable medium such as a magnetic disk or an optical disk, and may be a fixed recording medium such as a hard disk drive or a memory. The program incorporating the series of procedures of the plant control described above may be distributed via a communication line (including wireless communication) such as the Internet. Moreover, the program incorporating the series of procedures of the plant control described above may be distributed in an encrypted, modulated or compressed state via a wired line or a wireless line such as the Internet or in a manner stored in a recording medium.

(C) Others

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A plant control apparatus comprising:
   a deviation calculation processor programmed to calculate a deviation between a process value supplied from a plant to be controlled and a set value corresponding to a control object, and to generate a deviation signal, the plant comprising a plurality of operation terminals;
   a velocity-type PID calculation processor programmed to perform a PID calculation on receipt of the deviation signal from the deviation calculation processor, and to generate a velocity-type PID operation amount command signal corresponding to the deviation;
   a plurality of integral calculation processors provided in association with the number of the operation terminals and programmed to generate position command signals for the respective operation terminals as defined operation terminal position command signals in accordance with the operation amount command signal;
   a plurality of overwrite processors provided to respectively correspond to the integral calculation processors and programmed to generate additional position command signals for the respective operation terminals, to perform overwrite processing for the corresponding integral calculation processors and to newly define operation terminal position command signals; and
   an automatic balance processor programmed to be supplied with the velocity-type PID operation amount command signal from the velocity-type PID calculation processor, to be supplied with the defined operation terminal position command signals from the respective integral calculation processors, to compare the defined operation terminal position command signals, each corresponding to the respective operation terminals, with one another, to calculate a deviation between the defined operation terminal position command signals when the defined operation terminal position command signals are not equal to each other, to correct the operation amount command signal in accordance with a result of the calculation, and to supply the corrected operation amount command signal to the corresponding integral calculation processors.

2. The apparatus of claim 1,
wherein the overwrite processors generate overwrite processing signals during overwrite processing and supply the overwrite processing signals to the automatic balance processor,
the automatic balance processor corrects the operation amount command signal in accordance with the calculation result of the deviation between the defined operation terminal position command signals when all the overwrite processing signals are switched off after the overwrite processing signals are supplied to the automatic balance processor from at least one of the overwrite processors, and
the automatic balance processor stops operation when the deviation between the defined operation terminal position command signals is eliminated as a result of the output of the corrected operation amount command signal.

3. The apparatus of claim 2,
wherein the automatic balance processor uses a predetermined fixed value to correct the operation amount command signal when a deviation is found between the defined operation terminal position command signals.

4. The apparatus of claim 2,
wherein the automatic balance processor uses a variable value corresponding to the deviation between the defined operation terminal position command signals to correct the operation amount command signal when a deviation is found between the defined operation terminal position command signals.

5. The apparatus of claim 1,
wherein the automatic balance processor supplies the operation amount command signal to the integral calculation processors as it is when the overwrite processors are not performing overwrite processing.

6. The apparatus of claim 1,
wherein the automatic balance processor corrects the operation amount command signal when the deviation between the defined operation terminal position command signals is beyond a predetermined dead band.

7. The apparatus of claim 6,
wherein the automatic balance processor uses a predetermined fixed value to correct the operation amount command signal.

8. The apparatus of claim 6,
wherein the automatic balance processor uses a variable value corresponding to the deviation between the defined operation terminal position command signals to correct the operation amount command signal.

9. The apparatus of claim 6,
wherein the overwrite processors generate overwrite processing signals during overwrite processing and supply the overwrite processing signals to the automatic balance processor,
the automatic balance processor calculates a deviation between the defined operation terminal position command signals to correct the operation amount command signal on receipt of the overwrite processing signal from at least one of the overwrite processors, and
the automatic balance processor stops operation when the deviation between the defined operation terminal position command signals falls within the dead band as a result of the output of the corrected operation amount command signal.

10. A plant control method comprising:
calculating a deviation between a process value supplied from a plant to be controlled and a set value corresponding to a control object, and then generating a deviation signal, the plant comprising a plurality of operation terminals;
performing a PID calculation from the deviation signal, and generating a velocity-type PID operation amount command signal corresponding to the deviation;
performing an integral calculation from the operation amount command signal and generating position command signals for the respective operation terminals as defined operation terminal position command signals in a case of an automatic mode;
generating additional position command signals for the respective operation terminals and overwriting the corresponding integral calculation and newly defining operation terminal position command signals when at least one of the operation terminals has shifted from the automatic mode to an overwrite mode; and
when canceling the entire overwrite mode and returning to the automatic mode, comparing the defined operation terminal position command signals, each corresponding to the respective operation terminals, with one another, calculating a deviation between the defined operation terminal position command signals when the defined operation terminal position command signals are not equal to each other, correcting the operation amount command signal in accordance with a result of the calculation, performing the integral calculation from the corrected operation amount command signal, and generating position command signals for the respective operation terminals as newly defined operation terminal position command signals.

11. The method of claim 10,
wherein the correction of the operation amount command signal is started when a deviation is found between the defined operation terminal position command signals.

12. The method of claim 11,
wherein the correction of the operation amount command signal is made by use of a predetermined fixed value.

13. The method of claim 11,
wherein the correction of the operation amount command signal is made by use of a variable value corresponding to the deviation between the defined operation terminal position command signals.

14. The method of claim 11,
wherein the correction of the operation amount command signal is made until the deviation between the defined operation terminal position command signals is eliminated.

15. The method of claim 10,
wherein the correction of the operation amount command signal is started when the deviation between the defined operation terminal position command signals is beyond a predetermined dead band.

16. The method of claim 15,
wherein the correction of the operation amount command signal is made by use of a predetermined fixed value.

17. The method of claim 15,
wherein the correction of the operation amount command signal is made by use of a variable value corresponding to the deviation between the defined operation terminal position command signals.

18. The method of claim 10,
wherein the correction of the operation amount command signal is made until the deviation between the defined operation terminal position command signals falls within a predetermined dead band.

19. A non-transitory computer-readable recording medium in which a program that causes a computer to carry out plant control is stored, the plant control comprising:

calculating a deviation between a process value supplied from a plant to be controlled and a set value corresponding to a control object, and then generating a deviation signal, the plant comprising a plurality of operation terminals;

performing a PID calculation from the deviation signal, and generating a velocity-type PID operation amount command signal corresponding to the deviation;

performing an integral calculation from the operation amount command signal and generating position command signals for the respective operation terminals as defined operation terminal position command signals in a case of an automatic mode;

generating additional position command signals for the respective operation terminals and overwriting the corresponding integral calculation and newly defining operation terminal position command signals when at least one of the operation terminals has shifted from the automatic mode to an overwrite mode; and when canceling the entire overwrite mode and returning to the automatic mode, comparing the defined operation terminal position command signals, each corresponding to the respective operation terminals, with one another, calculating a deviation between the defined operation terminal position command signals when the defined operation terminal position command signals are not equal to each other, correcting the operation amount command signal in accordance with a result of the calculation, performing the integral calculation from the corrected operation amount command signal, and generating position command signals for the respective operation terminals as newly defined operation terminal position command signals.

* * * * *